(12) United States Patent
Nardella

(10) Patent No.: US 11,192,071 B2
(45) Date of Patent: Dec. 7, 2021

(54) VORTEX FOUNTAINS AND METHODS OF USE

(71) Applicant: Marc Nardella, Calgary (CA)

(72) Inventor: Marc Nardella, Calgary (CA)

( * ) Notice: Subject to any disclaimer, the term of this patent is extended or adjusted under 35 U.S.C. 154(b) by 0 days.

(21) Appl. No.: 16/706,655

(22) Filed: Dec. 6, 2019

(65) Prior Publication Data

US 2020/0246762 A1 Aug. 6, 2020

Related U.S. Application Data

(62) Division of application No. 15/652,210, filed on Jul. 17, 2017, now Pat. No. 10,507,440.

(60) Provisional application No. 62/363,321, filed on Jul. 17, 2016.

(51) Int. Cl.
| | | |
|---|---|---|
| *B01F 3/04* | (2006.01) | |
| *C02F 1/00* | (2006.01) | |
| *B05B 17/08* | (2006.01) | |
| *B67D 1/00* | (2006.01) | |
| *C02F 1/32* | (2006.01) | |
| *B67D 1/08* | (2006.01) | |
| *C02F 1/38* | (2006.01) | |

(52) U.S. Cl.
CPC ............ *B01F 3/0412* (2013.01); *B05B 17/08* (2013.01); *B67D 1/0004* (2013.01); *C02F 1/001* (2013.01); *B01F 2003/04184* (2013.01); *B67D 1/0872* (2013.01); *B67D 1/0875* (2013.01); *C02F 1/005* (2013.01); *C02F 1/325* (2013.01); *C02F 1/385* (2013.01); *C02F 2301/026* (2013.01); *C02F 2303/04* (2013.01); *C02F 2307/10* (2013.01)

(58) Field of Classification Search
CPC ......... B01F 3/0412; B01F 2003/04184; B05B 17/08; B67D 1/0004; B67D 1/0872; B67D 1/0875; C02F 1/001; C02F 1/005; C02F 1/325; C02F 1/385; C02F 2301/026; C02F 2303/04; C02F 2307/10
USPC ................. 261/4, 79.2, DIG. 75; 239/22, 23
See application file for complete search history.

(56) References Cited

U.S. PATENT DOCUMENTS

| | | | | | |
|---|---|---|---|---|---|
| 2,935,840 | A | * | 5/1960 | Schoppe | B01J 19/00 60/208 |
| 3,675,396 | A | * | 7/1972 | Hawryluk | B01D 47/021 96/262 |
| 4,297,111 | A | * | 10/1981 | Ross | B01D 3/30 159/49 |
| 4,734,109 | A | * | 3/1988 | Cox | B01F 5/02 95/189 |
| 5,344,233 | A | * | 9/1994 | Barger | B01F 13/1033 366/156.1 |

(Continued)

*Primary Examiner* — Charles S Bushey
(74) *Attorney, Agent, or Firm* — Robert A. Nissen

(57) ABSTRACT

A fountain has: a water source; a housing; a vortex chamber defined within the housing, the vortex chamber connected to receive water from the water source; a bubble chamber defined within the housing and connected to receive water from the vortex chamber and cause air bubbles to percolate within the bubble chamber; and a water outlet defined in the bubble chamber. A fountain has: a water source; a housing; a vortex chamber defined within the housing, the vortex chamber connected to receive water from the water source; a second chamber defined within the housing and connected to receive water from the vortex chamber; and a plurality of water outlets defined in the second chamber.

19 Claims, 4 Drawing Sheets

(56) References Cited

U.S. PATENT DOCUMENTS

| | | | | |
|---|---|---|---|---|
| 5,405,497 | A * | 4/1995 | Torregrossa | B01J 8/14 |
| | | | | 162/38 |
| 6,164,332 | A * | 12/2000 | Hatton | C02F 1/481 |
| | | | | 137/190 |
| 6,207,064 | B1 * | 3/2001 | Gargas | B01F 3/0446 |
| | | | | 210/205 |
| 6,335,191 | B1 * | 1/2002 | Kiplinger | C12M 41/40 |
| | | | | 435/252.1 |
| 7,326,339 | B1 * | 2/2008 | Hatton | C02F 1/481 |
| | | | | 210/195.1 |
| 10,507,440 | B2 * | 12/2019 | Nardella | C02F 1/001 |
| 2003/0070991 | A1 * | 4/2003 | Hatton | C02F 1/481 |
| | | | | 210/695 |
| 2003/0094421 | A1 * | 5/2003 | Gargas | C02F 1/78 |
| | | | | 210/760 |
| 2008/0048348 | A1 * | 2/2008 | Kung | A01K 63/042 |
| | | | | 261/76 |
| 2009/0078792 | A1 * | 3/2009 | Vlasak | B01F 3/04503 |
| | | | | 239/403 |
| 2012/0073691 | A1 * | 3/2012 | Davis | G09F 19/12 |
| | | | | 137/808 |
| 2016/0176727 | A1 * | 6/2016 | Younis | B01J 19/2405 |
| | | | | 422/24 |

* cited by examiner

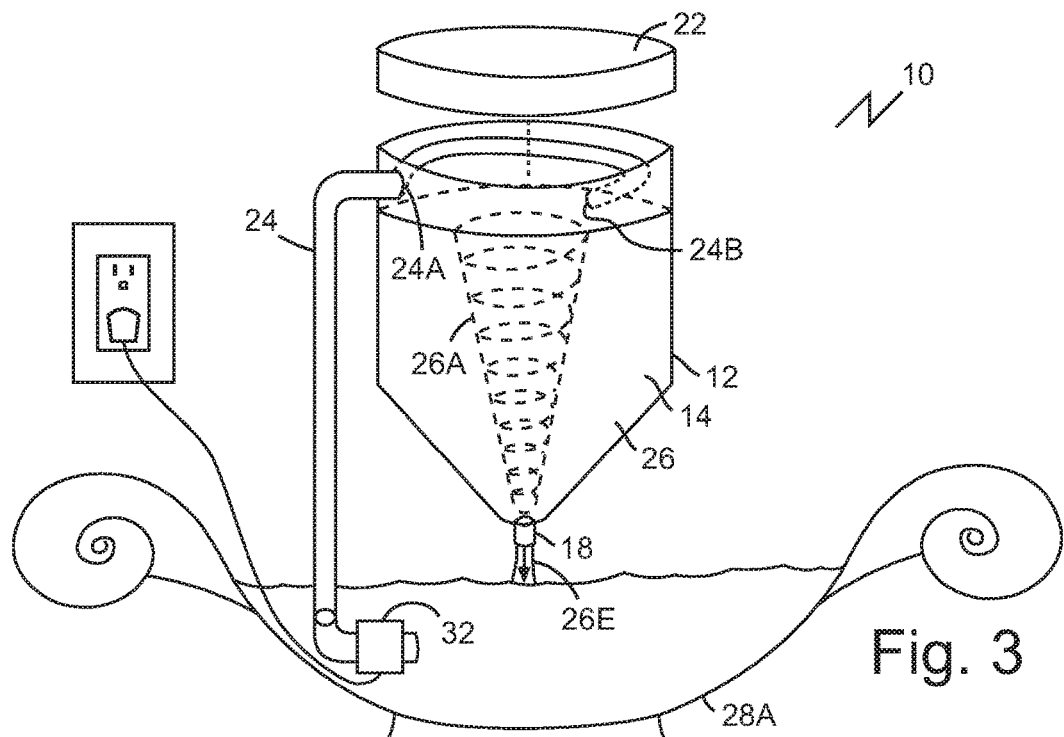
Fig. 3
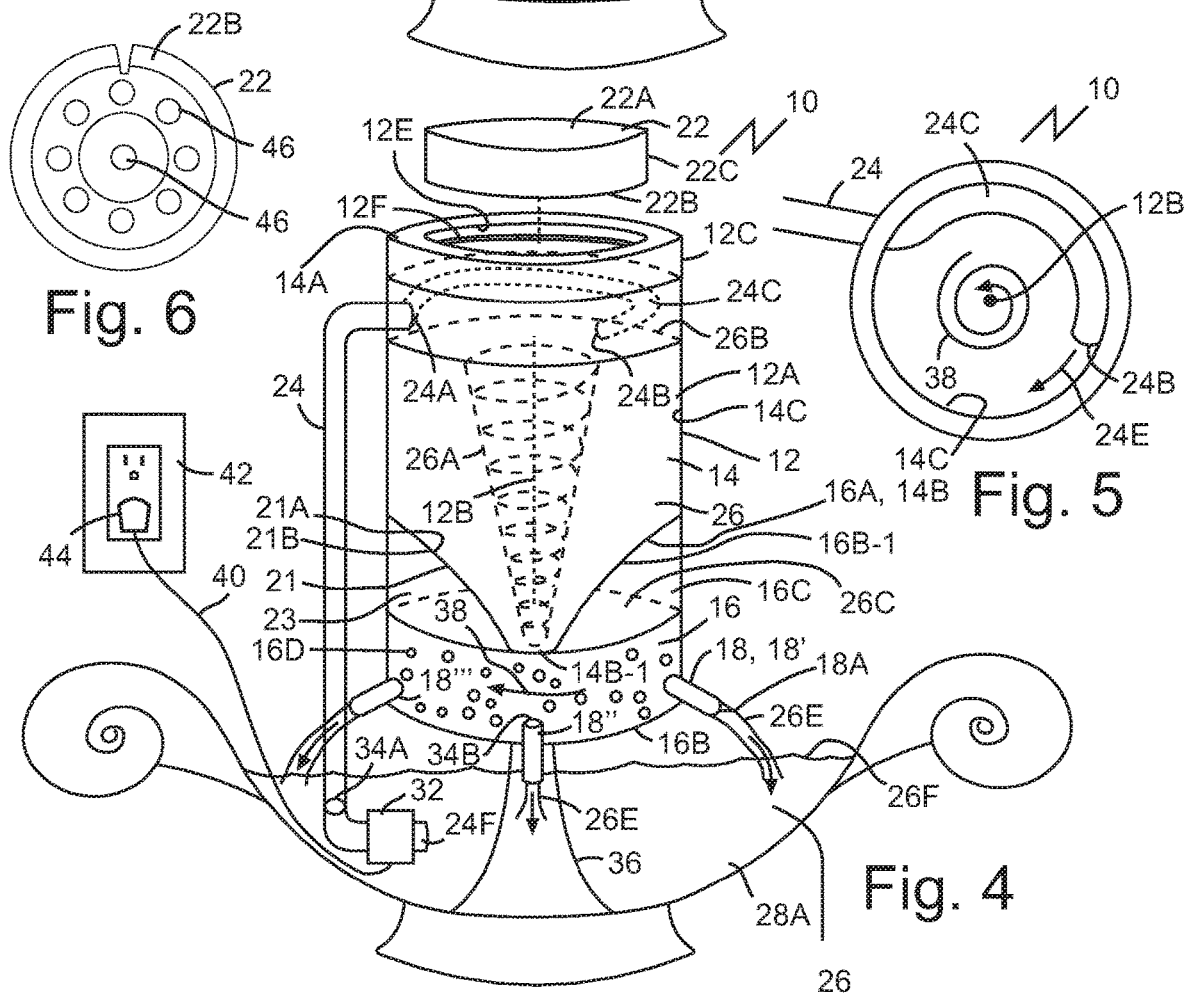
Fig. 6
Fig. 5
Fig. 4

VORTEX FOUNTAINS AND METHODS OF USE

TECHNICAL FIELD

This document relates to vortex fountains and methods of use.

BACKGROUND

Vortex fountains are known that circulate water in a vortex through an ampule or a cylinder, with or without internal lighting, for drinking or other purposes. Bubble walls exist that produce bubbles in thin plat-like water tanks. Regular siphons, siphon fluids from a higher to lower level and do not allow a visible vortex to occur while siphoning. Regular siphons need to be primed in an inconvenient manner in order to function. Shake siphons are primed in a convenient manner; however, they require shaking and produce no vortex. Presently siphons are not known to be an interchangeable fountain component and do not produce a flowing vortex when powered by a pump or while in normal siphon operation.

SUMMARY

A fountain is disclosed comprising: a water source; a housing; a vortex chamber defined within the housing, the vortex chamber connected to receive water from the water source; a bubble chamber defined within the housing and connected to receive water from the vortex chamber and cause air bubbles to percolate within the bubble chamber; and a water outlet defined in the bubble chamber.

A fountain is disclosed comprising: a water source; a housing; a vortex chamber defined within the housing, the vortex chamber connected to receive water from the water source; a second chamber defined within the housing and connected to receive water from the vortex chamber; and a plurality of water outlets defined in the second chamber.

A fountain is disclosed comprising: a water source; a housing; a vortex chamber defined within the housing, with a supply line connected to siphon water from the water source into the vortex chamber; and a water outlet connected to drain water from the housing.

A fountain may have a siphon with a curved inlet chamber. This allows a vortex to occur during operation and provides a removable lid for convenient, self-priming, filling ease. The fountain may have a dual functionality ability being both a vortex siphon (without pump) and vortex fountain (when a pump is applied). Both functional aspects of the fountain may be used interchangeably or separate from each other. The intake tube of the fountain may be connected to the curved inlet chamber that guides incoming fluid round the periphery of the chamber, thus inducing a vortex. The chamber may contain fluid and maintain its fluid level, in order to maintain the vortex. In siphon operation this may be done by controlling the outflow. In siphon operation the outlet may be the same size as the inlet or smaller. The smaller the outlet, the narrower the vortex becomes. In siphon operation if the outlet is bigger than the inlet then the fluid level within the chamber may drain out and cease to operate as intended. In fountain operation as long as the pump can keep up to the outflow, fluid level within the chamber will be maintained.

The lid on the chamber may be beneficial to both siphon and fountain. On the siphon, the lid provides the user easy access to fill the chamber with fluid before operation. This self-primes the siphon in a convenient manner. In fountain operation the lid may not be necessary as long as the pump can match or exceed the outflow of the fluid; however, it provides a convenient and novel method of housing for lighting the vortex fountain, which is beneficial. The vortex chamber may be attached to a second chamber that creates an aesthetically pleasing, interstitial effect that can be used to divert and enhance the outflow of fluid. When used as a fountain, the fountain may be mounted to a reservoir, a basin, a stand, a table, counter, or shelf top, a wall, a wall-mounted plate, or a base-plate.

In various embodiments, there may be included any one or more of the following features: The vortex chamber is located above the bubble chamber and separated by a partition plate with an opening that fluidly connects the vortex chamber and the bubble chamber. An upper surface of the partition plate is tapered with decreasing width toward the bubble chamber. The upper surface forms a funnel that terminates in the opening. An underside of the partition plate is shaped to define an annular cavity that forms an upper portion of the bubble chamber. The upper surface is planar. The partition plate is a planar ring. During use an upper portion of the bubble chamber is filled with air. The water outlet has a minimum cross-sectional flow area that is larger than a minimum cross-sectional flow area defined between the vortex chamber and the bubble chamber. The water outlet comprises a plurality of water outlets. The plurality of water outlets are arranged at different angular positions about an encircling side wall of the housing. The housing is cylindrical. A basin positioned underneath the bubble chamber. A base end of the water outlet is spaced above a water level in the basin. The water source comprises the basin, and further comprising a supply line connected between the basin and the vortex chamber, with a pump on the supply line. The water source is positioned at a relatively greater height than the vortex chamber with a supply line connected to siphon water from the water source into the vortex chamber. A water inlet defined in the vortex chamber and connected to the water source, in which the water inlet is oriented to direct incoming water to rotate around an interior encircling surface of a side wall of the housing. The water inlet is defined at an end of a curved supply line that wraps at least partially around the interior encircling surface. The water outlet is structured to be always open. A top end of the housing defining the vortex chamber is open ended, and further comprising a lid positioned on the top end. One or more light sources oriented to direct light through the lid. A filter on one or more of the water outlet or a supply line connected between the water source and the vortex chamber. Operating the fountain to cycle water through the vortex chamber. Operating the fountain to cycle water through the vortex chamber and the bubble chamber. An ultraviolet light source oriented to direct ultraviolet light into water within the housing. An electricity generator connected to generate electricity by converting energy from the movement of water through the fountain.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 3 is a partially exploded perspective view of a vortex fountain having a lid and being connected to receive and supply water from and to a basin via a pump and a supply line.

FIG. 4 is a partially exploded perspective view of a vortex fountain connected to receive and supply water from and to a basin via a pump and a supply line, with the vortex fountain having a lid and a vortex chamber that feeds a bubble chamber.

FIG. 5 is a top plan view of the open top end of the vortex fountain of FIG. 4 with the lid removed.

FIG. 6 is a bottom plan view of a lid used in the vortex fountain of FIG. 4.

DETAILED DESCRIPTION

Figure 1:
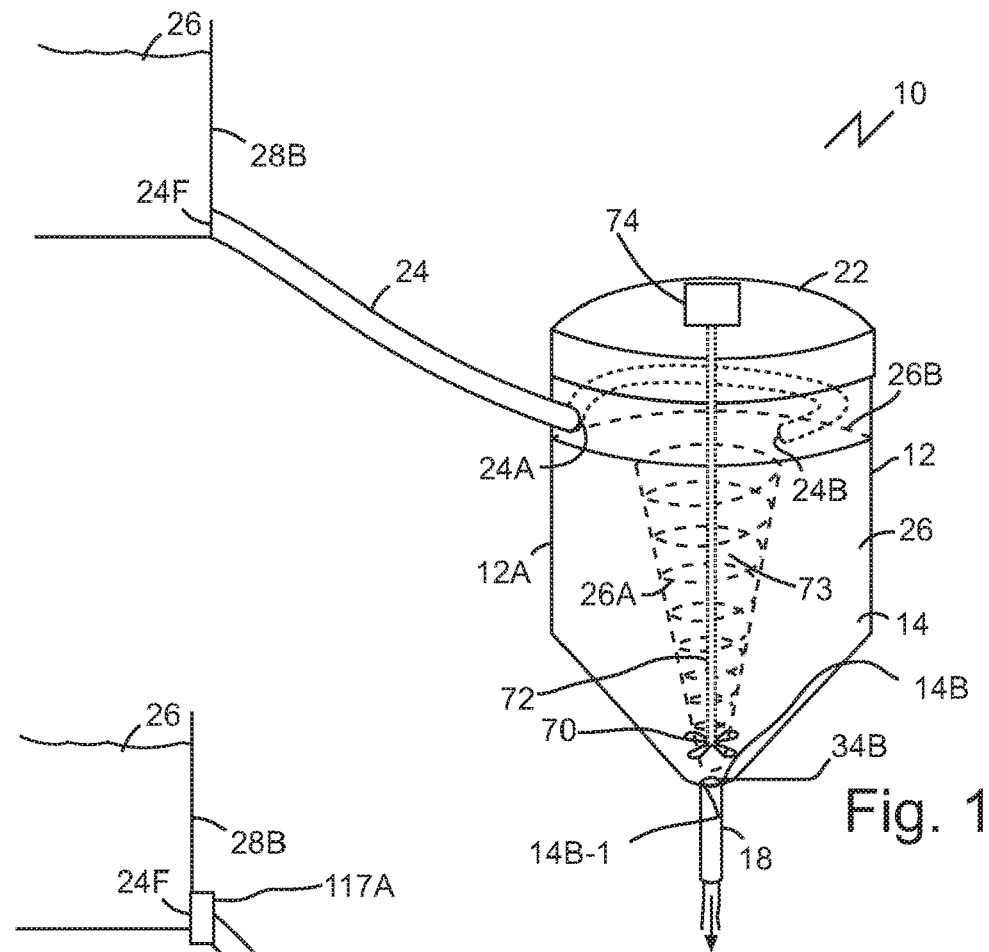
FIG. 1 is a partially exploded perspective view of a vortex fountain having a lid and being connected to siphon water from a water source.

Immaterial modifications may be made to the embodiments described here without departing from what is covered by the claims.

A fountain is a piece of architecture or equipment that cycles water through, out of, or over a structure to supply drinking water or for a decorative or dramatic effect. In some cases a fountain pours water into a basin or jets it into the air for such purposes. In ancient history, fountains were originally purely functional, connected to springs or aqueducts and used to provide drinking water and water for bathing and washing to the residents of cities, towns and villages. Until the late 19th century most fountains operated by gravity, and needed a source of water at a higher potential energy (height) than the fountain, such as a reservoir or aqueduct, to make the water flow or jet into the air.

By the end of the 19th century, as indoor plumbing became the main source of drinking water, urban fountains became purely decorative. Mechanical pumps replaced gravity and allowed fountains to recycle water and to force it high into the air. Fountains are used today to decorate city parks and squares; to honor individuals or events; for recreation or entertainment, and as fixtures in homes, offices, malls, and other indoor applications. Drinking fountains provide clean drinking water in public buildings, parks and public spaces.

In fluid dynamics, a vortex is a region in a fluid in which the flow rotates around an axis line, which may be straight, curved, or more complex and chaotic, dynamic or steady state shapes. The plural of vortex is either vortices or vortexes. Vortices form in stirred or poured fluids, and may be observed in phenomena such as smoke rings, whirlpools in the wake of boat, or the winds surrounding a tornado.

Vortices are a major component of turbulent flow. The distribution of velocity, vorticity (the curl of the flow velocity), as well as the concept of circulation are used to characterize vortices. In most vortices, the fluid flow velocity is greatest next to its axis and decreases in inverse proportion to the distance from the axis. In the absence of external forces, viscous friction within the fluid tends to organize the flow into a collection of irrotational vortices, possibly superimposed to larger-scale flows, including larger-scale vortices. Once formed, vortices can move, stretch, twist, and interact in complex ways. A moving vortex carries with it some angular and linear momentum, energy, and mass.

In the absence of external forces, a vortex usually evolves fairly quickly toward the irrotational flow pattern, where the flow velocity is inversely proportional to the distance from the axis. Irrotational vortices are also called free vortices. By contrast, a rotational vortex—one which has non-zero vorticity away from the core—can be maintained indefinitely in that state only through the application of some extra force, that is not generated by the fluid motion itself. For example, if a water bucket is spun at constant angular speed w about its vertical axis, the water will eventually rotate in rigid-body fashion. The particles will then move along circles, and the free surface of the water will assume a parabolic shape.

Referring to FIG. 4, a vortex fountain 10 is illustrated comprising a water source, such as basin 28A, a housing 12, and a vortex chamber 14 defined within the housing 12, which may be cylindrical as shown. In some cases the water source may be omitted and the housing 12 and vortex chamber 14 may be structured to connect to a suitable water source. The vortex chamber 14 may be connected, for example via supply line 24, to receive water 26 from the water source. During use, the fountain 10 is operated to cycle water through the vortex chamber 14 and out a water outlet 18, in some cases returning back to the water basin 28A.

Referring to FIG. 4, the water 26 in the vortex chamber 14 orients itself into the configuration of a vortex 26A. The vortex 26A may extend from a top level 26B of water 26 to an opening 14B-1, which in other cases may be water outlet 18, at which point the water 26 exits the vortex chamber 14. The vortex chamber 14 may be structured to form a vortex 26A. Referring to FIGS. 4 and 5, water supplied via line 24 may enter the chamber 14 through a water inlet 16, which is defined in the vortex chamber 14 and may be oriented to direct incoming water 26 to rotate, for example in a rotational direction 38, around an interior encircling surface 14C of a side wall, such as a cylindrical side wall 12A, of the housing 12. The water inlet 24B may be defined at an end of a curved supply line 24C that wraps at least partially around the interior encircling surface 14C. The line 24C may also be spaced radially inward relative to the surface 14C. Line 24 may enter the housing 12 at an entry point 24A, for example in side wall 12A. Plural inlets 24B may be used. The inlet 24B may direct incoming water in a direction 24E that is tangential to a circumference or other cross-sectional perimeter profile of surface 14C. Other mechanisms of forming a vortex may be used, such as shaping the surface 14C to rotate fluid. In some cases the location of the opening 14B-1, for example located centrally at a bottom of a funnel-shaped plate 21, may cause the formation of a vortex, by a plughole vortex effect.

Referring to FIG. 4, a second chamber, such as a bubble chamber 16, may be defined by housing 12. The vortex chamber 14 may be located above the bubble chamber 16, for example separated by a partition plate 21. An opening 14B-1 may fluidly connect the vortex chamber 14 and the bubble chamber 16. The water outlet 18 may be defined in the bubble chamber 16.

Referring to FIG. 4, the partition plate 21 may have a suitable shape. In the example shown an upper surface 21A of the partition plate 21 is tapered with decreasing width toward the bubble chamber 16, for example down an axis 12B of the housing 12 from a top end 14A of the vortex chamber to a base 14B of the vortex chamber 14. The shape shown is an example of the upper surface 21A forming a funnel that terminates in the opening, which is shown as a central opening 14B-1. An undersurface 21B of the partition plate 21 may follow the inverse of the funnel shape, for example may be shaped to define an annular cavity 23 that forms an upper portion of the bubble chamber 16. The undersurface 21B may define the top 16A of chamber 16. The partition plate 21 may have conical or curved conical walls 16B-1.

Figure 8:
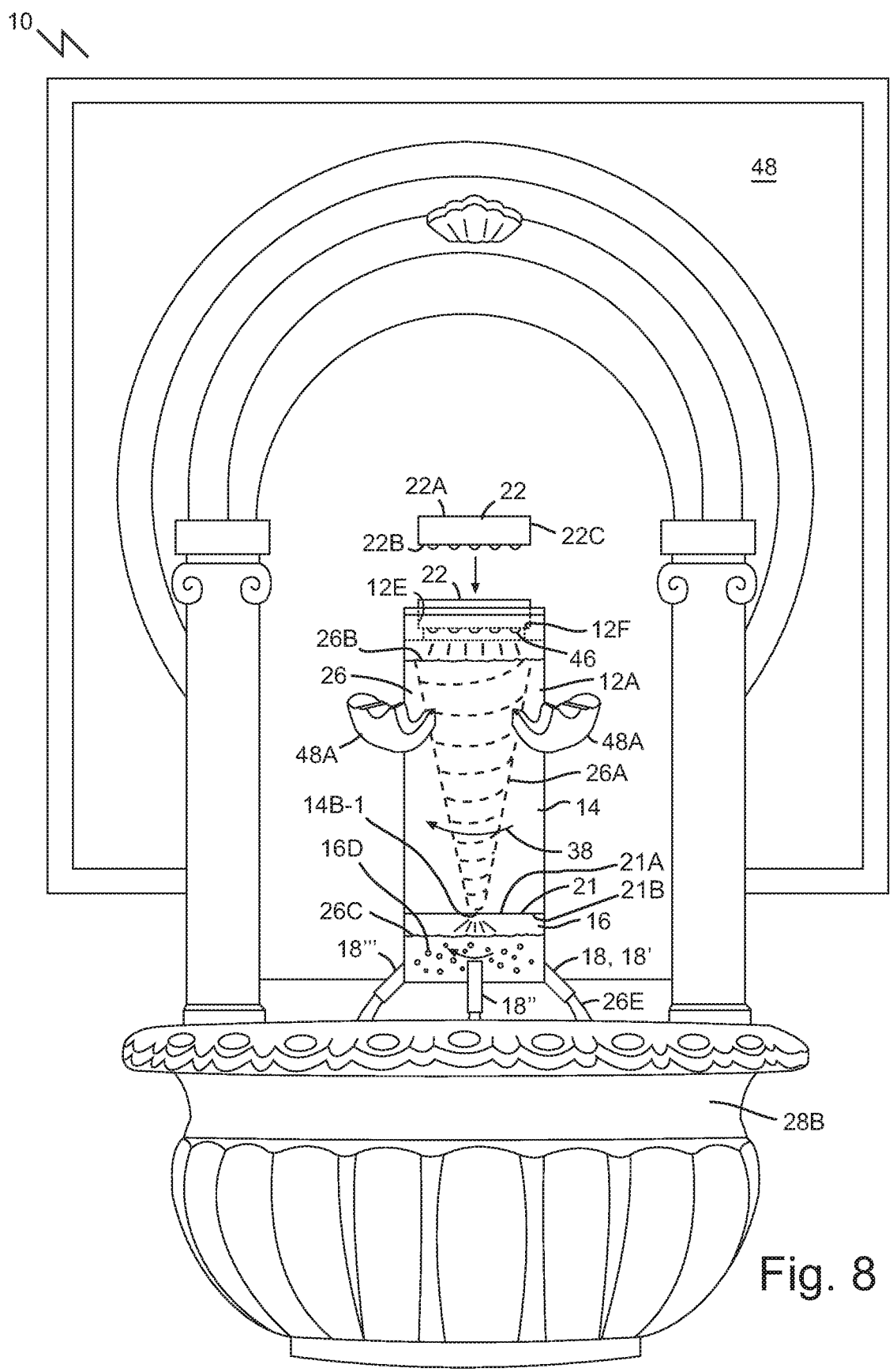
FIG. 8 is a side elevation view of the vortex fountain of FIG. 4 integrally mounted within an ornamental structural frame depicting a gothic theme.

Referring to FIG. 8, in some embodiments all or part of the partition plate 21 is planar. For example, the upper surface 21A may be planar, the base surface 21B may be planar, or the entire plate 21 may be planar, for example if same forms a planar ring as shown. In some cases a combination of plates is used, for example a planar and funnel plate (not shown).

Referring to FIG. 4, bubble chamber 16 may cause air bubbles 16D to percolate within the bubble chamber 16 during use. Air bubble formation may be caused by one or more of a variety of mechanisms. For example, the bubble chamber 16 may be structured such that an upper portion, such as annular cavity 23, is filled with air during use, for example forming an air gap 16C overtop of a water level 26C in chamber 16. The chamber 16, for example opening 14B-1, may be structured to cause turbulent flow to entrain some of the air, leading to bubble formation. In the example shown, the opening 14B-1 is sized to ensure that water 26 entering the bubble chamber 16 retains the rotational spin in direction 38, thus leading to turbulence in chamber 16. The water level 26C may be spaced below the opening 14B-1 to provide a stream of water into level 26C to cause further turbulence and bubble 16D formation. Bubbles have an aesthetically pleasing appearance within the chamber 16, and do not obstruct or interfere with the operation of the vortex 26A in chamber 14 due to the separation of the chambers.

Referring to FIG. 4, the bubble effect may be managed by structuring the sizes of the opening 14B-1 and any outlets 18. For example, the water outlet 18 may have a minimum cross-sectional flow area that is equal to or larger than a minimum cross-sectional flow area of the opening 14B-1. If plural outlets or openings are used the calculation would require that the flow areas be added by the individual outlets or openings, respectively, to determine the net flow area. Because the water flows through the chambers 14 and 16 by gravity, the size of the outlets determines the net flux across the outlets, and hence the size of the air gap 16C. Other flow area ratios may be used including having the outlet 18 area smaller than the opening 14B-1 area. With a siphon example, the flow area on the outlet 18 may be equal to or smaller than the flow area on the opening 14B-1, to cause bubbles. In the pumped example, any ratio may be used, including having larger flow area on the outlets 18 than the opening 14B-1.

Figure 2:
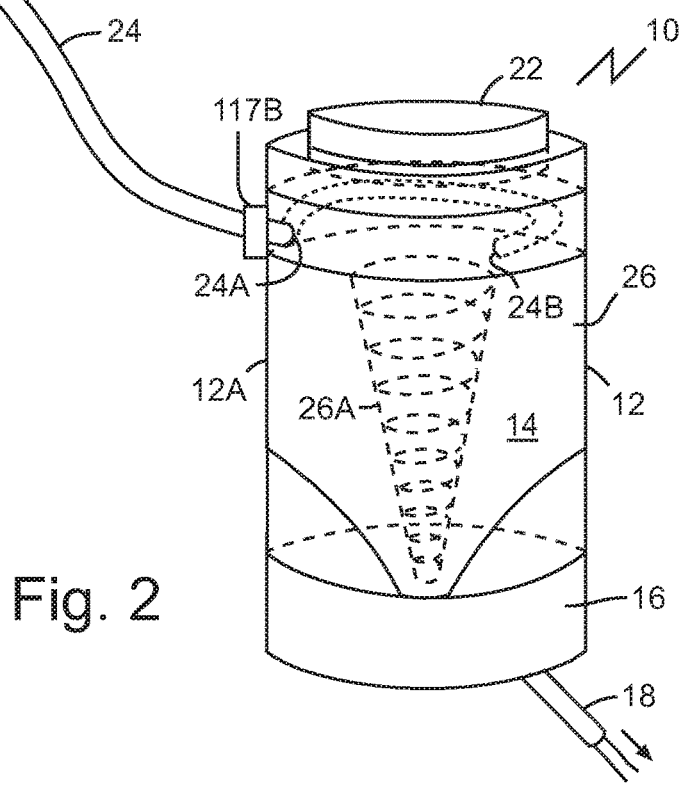
FIG. 2 is a partially exploded perspective view of a vortex fountain connected to siphon water from a water source, with the vortex fountain having a lid and a vortex chamber that feeds a bubble chamber.

Referring to FIG. 4, the water outlet 18 may comprise a plurality of water outlets, such as outlets 18', 18", and 18'". The outlets 18 may be defined in the base or bubble chamber 16. The plurality of water outlets 18 may be arranged at different angular positions about an encircling side wall 12A of the housing 12. The use of plural outlets may add to the bubble formation effect, for example by increasing the flux out of the bubble chamber 16 and/or by supplying air bubbles 16D into the chamber 16 through the outlets 18. The outlets 18 shown are short tubes that extend from respective positions adjacent or at a base 16B of the chamber 16. Referring to FIG. 2, in some cases the outlet 18 is in the base 16B itself.

Referring to FIG. 4, water 26 may be supplied to the vortex chamber 14 by a suitable method. For example, a pump 32 may be provided, for example on the supply line 24. A base tip 24F of the line 24 may be located within the basin 28A, in order to suction water 26 up the line 24. A suitable power source for the pump may be provided, for example a power cord 40 and plug 44 connectable to a wall-mounted or other power outlet 42. Other power sources may be used such as a battery or solar panel.

Referring to FIGS. 1 and 2, water 26 may also be supplied via a siphon. Water in the water source, such as reservoir 28B, may be oriented to have a higher potential energy than water 26 in the vortex chamber 14. In the simplest example the reservoir 28B is above the vortex chamber 14, with a supply line 24 connected to siphon water from the water source into the vortex chamber 14. In another example the water may be supplied via a tap, or other source under a relatively higher pressure than the opposing pressure produced by the water 26 in the chamber 14, to permit a net flow of water into the chamber 14. Two versions are illustrated, one housing 12 with a bubble chamber 16 (FIG. 2), and one without (FIG. 1) where the outlet 18 depends directly below opening 14B-1. Referring to FIG. 2, a flow control device, such as a control valve 117A and/or 117B, or push-to-open-button valve may be used on the line 24 or at another suitable location such as on the reservoir 28B (valve 117A), on the inlet to the housing 12 (valve 117B), to initiate flow.

Referring to FIG. 4, the fountain 10 may be structured to produce the sounds, aroma, and aesthetics of running water. As shown the basin 28A may be positioned underneath the bubble chamber 16. A base end 18A of the water outlet 18 may be spaced above a water level 26F in the basin 28A. Such an orientation will cause streams 26E of water to eject from ends 18A and fall into basin 28A. The housing 12 may be suspended above the water level 26F by a suitable method, such as via a stand 36 or other frame. The water outlet 18 may be structured to be always open, for example without valves such as an on/off valve. The addition of plural outlets 18 may increase the noise generated (and in some case negative ions) by running water streams 26E, increasing the aesthetic experience of the fountain 10.

Referring to FIG. 4, the fountain 10 may include a lid 22. A top end, for example end 14A, of the housing 12 may be open ended as shown. Lid 22 may be positionable on the top end 14A, for example by threading, friction fit, or other methods of seating the lid 22. Referring to FIGS. 2 and 4, the same lid 22 is shown in the closed and open positions, respectively. Referring to FIGS. 4 and 8, the lid 22 may be sized to fit within an aperture 12E, for example in a collar 12C at top end 14A. The side wall, such as cylindrical side wall 22C of lid 22, may be shaped to correspond with the shape of the aperture 12E. The collar 12C may have a flange 12F that seats a base end 22B of the lid 22 opposite a top end 22A of the lid. Other features may be used with the lid 22, such as a hinge (not shown) to allow the lid to pivot or rotate open. Magnets (not shown), retaining walls, locks, or other parts may be used to secure the lid 22 in place. One or more finger holds (not shown) may be provided in lid 22 for ease of removal of same from housing 12.

Referring to FIGS. 4, 6, and 8, a light may be provided in fountain 10. For example, LED (light emitting diode) lights 46 may be arrayed in base end 22B of lid 22. Other configurations may be used to provide lights that project into water within either or both of chambers 14 and 16. In the example shown the lights project down into the vortex chamber 14. The projection of light across the complex and dynamic geometry of the surfaces of the vortex 26A leads to a chaotic and aesthetically pleasing display of lights, particularly in a darkened room. The lights used may be colored, and may be connected to a controller (not shown) to provide various colors, lighting patterns, and effects.

Figure 7:
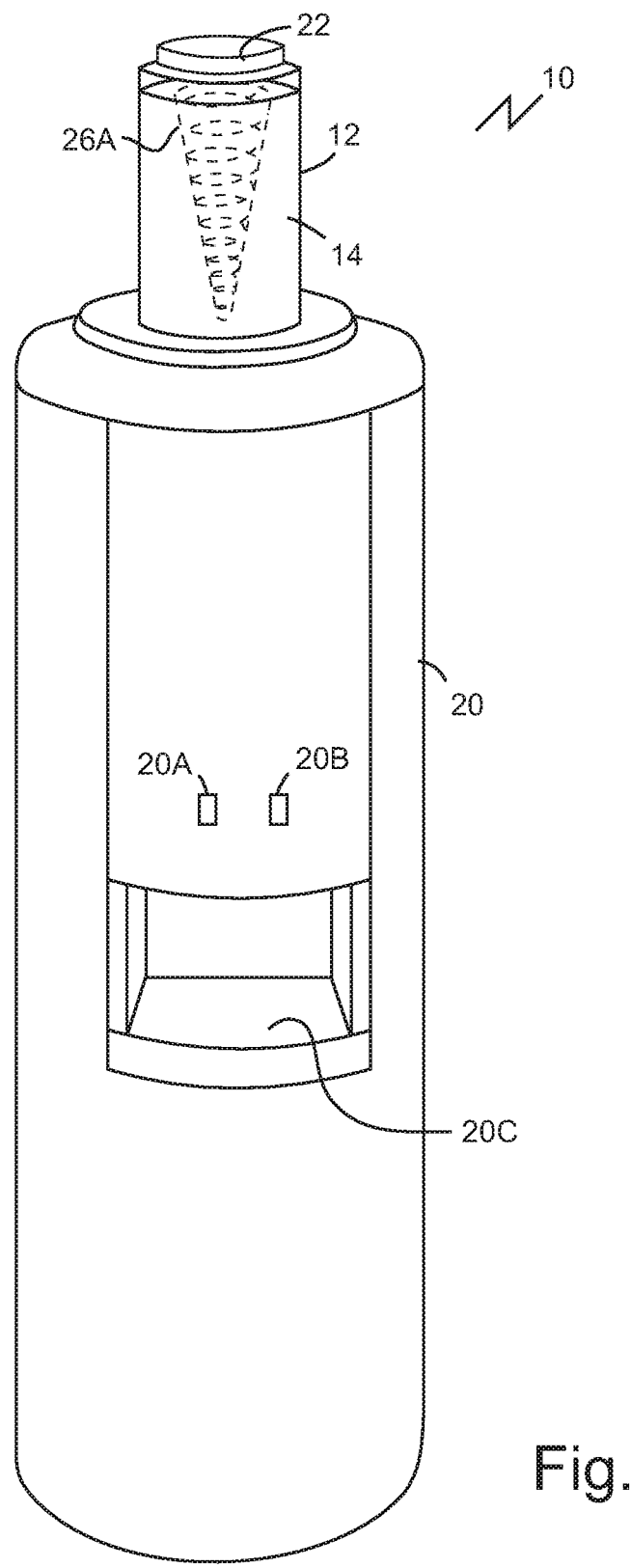
FIG. 7 is a perspective view of a vortex fountain used as a drinking fountain.

Referring to FIG. 7, the housing 12 may be used in conjunction with a drinking fountain, such as a water dispenser tower 20. The chamber 14 may provide a continual cycling of water in the chamber 14 and a water source, such as a second basin (not shown), to provide the aesthetically pleasing appearance of the vortex 26A in a structure that may be used to dispense water. Water may be dispensed in a suitable fashion, for example by placing a cup or bottle in a receptacle 20C and pressing a button, such as 20A or 20B, or otherwise opening a valve to dispense water. It is theorized that the action of the vortex may filter out contaminants in the water, and may form structured water, which some believe is healthier for the body to ingest than unstructured, standing water.

Other features may be present on fountain 10. For example, an ultraviolet light may be used to disinfect water flowing through the vortex chamber 14. Referring to FIG. 4, a filter 34 may be provided at a suitable location in the system. For example a filter 34 may be provided on one or more of the water outlet 18 or a supply line 24 connected between the water source and the vortex chamber. In the example shown a filter 34A is on the line 24. Referring to FIG. 1, a filter 34B may be at the outlet 18. Other locations for filter 34 may be used. The cycling of the water combined with the continual filtering of a filter 34 may improve the quality of the water over time.

The fountains 10 disclosed here may have suitable shapes and features. Referring to FIGS. 1 and 3, examples of fountains 10 are illustrated lacking a bubble chamber 16. The examples show a siphon example (FIG. 1), and a pumped example (FIG. 3). Referring to FIGS. 2 and 4, examples of fountains 10 are illustrated with a bubble chamber 16, in a siphon example (FIG. 2) and a pumped example (FIG. 3).

Referring to FIG. 8, another embodiment is illustrated of a fountain 10. In this example a decorative structural frame 48 is used to mount the housing 12 above the basin 28A. Decorative arms 48A wrap around the housing 12 to support the housing 12. The supply line 24 is hidden from view as such passes through the frame 48 to remain out of sight during use. A gothic feel is added to the frame 48 via columns and other characteristic architecture. Other fountains 10 may take suitable shapes. In some cases a plurality of fountains 10 may be used in tandem, for example to provide a wall of fountains 10.

Referring to FIG. 1, the fountain 10 may be structured to generate electricity. An electricity generator 74 may be connected to generate electricity by converting energy from the movement of water through the fountain 10. In the example shown an impellor 70 is mounted to a shaft 72 that depends from a generator 74 mounted to lid 22. The shaft 72 may be positioned within an air column 73 that is defined by the vortex 26A, and the impellor 70 may be located to contact water 26 that defines the vortex 26A, such that the vortex 26A will rotate the impellor 70 during use. The shaft 72 may be connected to rotate a rotor within a stator (not shown) of the generator 74, which may include other parts such as a copper coil and a commutator, to output electricity. The impellor 70 may be mounted adjacent or at the base 14B of the vortex chamber 14. The vortex 26A may spin faster in the lower, more narrow parts of the vortex 26A than the broader, higher parts of the vortex 26A. Other types of generators 74, including other locations of generator 74 on fountain 10 may be used. For example, generator 74 may be located on outlet 18, or supply line 24. Various reservoirs 28B may be used including a waterfall, river, ocean current, or other source of water.

Holes, openings, outlets, inlets, and slots, may be interchangeably used here, such that a hole may be replaced by a slot and so forth. The fountain 10 may be structured to provide an infinity pool effect, for example by housing 12 being open-ended and line 24 supplying an excess of water such that during use excess water spills over the perimeter rim of the housing 12. Water may be supplied to vortex chamber 14 at a suitable location, for example at base 14B, top 14A, or at a location in between. Two or more outlets 14B-1 may be provided between chambers 14 and 16. Although fountains 10 are described here for use with water, such may be used with other fluids such as oil. Bubble chamber 16 may be removable, for example connected to chamber 14 by threading. The chambers 14 and 16 may form integral parts of a cylindrical housing 12. References to "during use" refer to a steady state where the net flux of water into the chambers 14 and 16 is zero. Pump settings and opening sizes may require calibration to achieve optimal operational performance.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A fountain comprising:
   a water source;
   a housing;
   a vortex chamber defined within the housing, in which the water source is positioned at a relatively greater height than the vortex chamber with a supply line connected to siphon water by gravity from the water source, through a control valve and a water inlet, defined in the vortex chamber, into the vortex chamber; and
   a water outlet connected to drain water from the housing;
   in which the vortex chamber is oriented with the water inlet at or near a top of the vortex chamber and the water outlet at a bottom of the vortex chamber to permit the vortex chamber to create a vortex that defines a vertical axis upon opening the control valve.

2. The fountain of claim 1:
   further comprising a bubble chamber defined within the housing and connected to receive water from the vortex chamber and cause air bubbles to percolate within the bubble chamber; and
   in which the water outlet is defined in the bubble chamber.

3. The fountain of claim 2 in which the vortex chamber is located above the bubble chamber and separated by a partition plate with an opening that fluidly connects the vortex chamber and the bubble chamber.

4. The fountain of claim 3 in which an upper surface of the partition plate is tapered with decreasing width toward the bubble chamber to form a funnel that terminates in the opening.

5. The fountain of claim 3 in which the partition plate is a planar ring.

6. The fountain of claim 2 in which an upper portion of the bubble chamber is filled with air.

7. The fountain of claim 1 in which the water outlet comprises a plurality of water outlets.

8. The fountain of claim 7 in which the plurality of water outlets are arranged at different angular positions about an encircling side wall of the housing.

9. The fountain of claim 1 in which the housing is cylindrical.

10. The fountain of claim 2 further comprising a basin positioned underneath the bubble chamber, in which a base end of the water outlet is spaced above a water level in the basin.

11. The fountain of claim 1 in which the water source comprises a basin, and further comprising a supply line connected between the basin and the vortex chamber, with a pump on the supply line.

12. The fountain of claim 1 further comprising a water inlet defined in the vortex chamber and connected to the water source, in which the water inlet is oriented to direct incoming water to rotate around an interior encircling surface of a side wall of the housing.

13. The fountain of claim 12 in which the water inlet is defined at an end of a curved supply line that wraps at least partially around the interior encircling surface.

14. The fountain of claim 1 in which the water outlet is structured to be always open.

15. The fountain of claim 1 in which a top end of the housing defining the vortex chamber is open ended, and further comprising a lid positioned on the top end.

16. The fountain of claim 15 further comprising one or more light sources oriented to direct light through the lid.

17. The fountain of claim 1 further comprising a filter on one or more of the water outlet or a supply line connected between the water source and the vortex chamber.

18. The fountain of claim 1 further comprising an electricity generator connected to generate electricity by converting energy from the movement of water through the fountain.

19. A method comprising operating the fountain of claim 1 to cycle water from the water source through the vortex chamber.

* * * * *